Nov. 10, 1970 C. F. DE PRISCO ET AL 3,539,888

AUTOMATIC FREQUENCY CONTROL CIRCUIT FOR USE WITH ULTRASONIC SYSTEMS

Filed July 24, 1968 4 Sheets-Sheet 1

INVENTORS.
CARMINE F. DePRISCO
JAMES G. YOUNG
NICHOLAS MAROPIS
BY Seidel & Gonda
ATTORNEYS.

INVENTORS.
CARMINE F. DEPRISCO
JAMES G. YOUNG
NICHOLAS MAROPIS
BY Seidel & Gonda
ATTORNEYS.

INVENTORS.
CARMINE F. DePRISCO
JAMES G. YOUNG
NICHOLAS MAROPIS
BY Seidel & Gonda
ATTORNEYS.

INVENTORS.
CARMINE F. DePRISCO
JAMES G. YOUNG
NICHOLAS MAROPIS
BY
Seidel & Gonda
ATTORNEYS.

United States Patent Office 3,539,888

Patented Nov. 10, 1970

3,539,888

AUTOMATIC FREQUENCY CONTROL CIRCUIT FOR USE WITH ULTRASONIC SYSTEMS

Carmine F. De Prisco, Glen Mills, James G. Young, Phoenixville, and Nicholas Maropis, West Chester, Pa., assignors to Aeroprojects Incorporated, West Chester, Pa., a corporation of Pennsylvania Filed July 24, 1968, Ser. No. 747,136

Int. Cl. H02n

U.S. Cl. 318—116 10 Claims

ABSTRACT OF THE DISCLOSURE

An automatic frequency control circuit for an ultrasonic system includes means to detect the ultrasonic frequency of the system, irrespective of load; the signal is fed through a circuit that maintains its proper phase for synchronization; the signal is then applied to a free running oscillator which controls an inverter circuit in the power supply. The low level control signal forces the oscillator to synchronize to the signal frequency and hence the frequency of the power applied to the transducer is changed to the detected frequency.

This invention relates to an automatic frequency control circuit for use with ultrasonic systems. More particularly, this invention relates to an automatic frequency control system that imposes on the power supply oscillator a low level synchronizing frequency detected at and fed back from the load.

The present invention has utility to practically all types of ultrasonic equipment including welding, drawing, extruding, rolling, wrenching, drilling, cutting, machining, clamping, heat treating, etc. In each of these ultrasonic techniques it is desirable to have maximum power transfer, and thus it is essential that the alternating current supplied to the electromechanical ultrasonic transducer have a frequency that always corresponds to the frequency which permits maximum power transfer. This optimum frequency, however, may change for reasons such as variations in the load, modifications in the apparatus such as a different type of wrench, and for system characteristic changes during the application of power such as variations in temperature. The present invention provides a circuit for automatically controlling the frequency to maintain the same substantially at the desired optimum frequency.

Most sophisticated ultrasonic systems have some form of frequency control. Some systems provide for operator adjustment to resonance each time a system characteristic is changed. Other systems provide automatic frequency control of a type that is different than that disclosed herein. Previous automatic frequency control systems detect a signal which is used for positive feedback in a regenerative oscillator, or sense phase shift in the output circuit of the power supply and then effect adjustment in frequency proportional to the variation in phase shift. See for example U.S. patents 2,917,691 and 3,158,928. The difficulty with the known prior art techniques is that they do not faithfully yield optimum frequencies for the transducer load when the load impedance is highly reactive. The present invention overcomes the difficulties of the prior art and, indeed, provides other unexpected results in the nature of a "hunting" sweep within a narrow range about the optimum frequency.

In accordance with the present invention an automatic frequency control circuit for use with ultrasonic systems is provided wherein the ultrasonic energy transducer is operated at the optimum frequency. Since the optimum frequency is determined by the characteristics of the ultrasonic transducer-coupling system and its load, it may be further identified as that frequency at which the impedance of the loaded system best matches that of the frequency converter. The desired result is achieved by providing a sensing means for frequency control located at a position to detect an electrical signal indicative of the system characteristics, as for example minimum impedance (maximum admittance), and then synchronizing a free running oscillator to this signal. The oscillator is used to generate a gate signal in an inverter circuit which may consist of multiple banks of circuit devices such as silicon controlled rectifiers or transistors. Thus, by imposing onto a free running oscillator circuit a low level signal from a sensing source, the free running oscillator can be made to synchronize precisely to the detected signal. This permits gating of silicon controlled rectifiers or other circuit devices by an essentially constant level signal and also provides means to assure simultaneous gating of multiple banks of silicon controlled rectifiers.

It therefore is a general object of the present invention to provide a new and unobvious automatic frequency control for ultrasonic systems.

For the purpose of illustrating the invention, there is shown in the drawings a form which is presently preferred; it being understood, however, that this invention is not limited to the precise arrangements and instrumentalities shown.

Figure 1A:
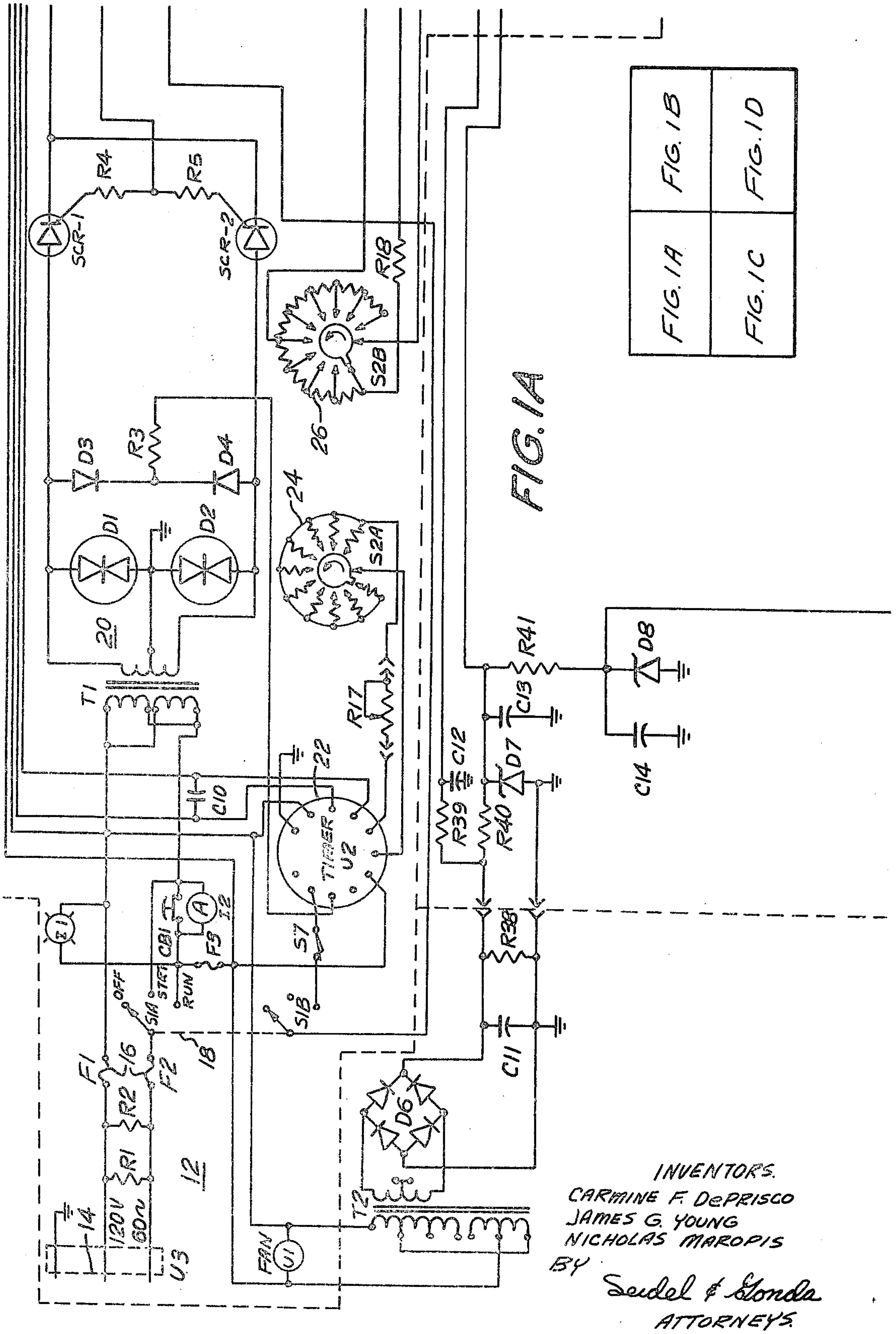
FIG. 1A shows a first portion of a schematic circuit diagram for an automatic frequency control system.

The arrangement of FIGS. 1A, 1B, 1C, and 1D to form a complete schematic of the automatic frequency control circuit is illustrated with FIG. 1A.

Referring now to the drawings in detail, wherein like numerals indicate like elements, there is shown a schematic diagram for a frequency converter and automatic frequency control circuit for use with ultrasonic systems. The illustrated circuit coverts 120-volt, 60-cycle commercial power to filtered direct current which is thereafter inverted to provide ultrasonic frequency power to a transducer 10. The power delivered to the ultrasonic transducer-coupling system is variable according to the type of load to which the transducer is connected. It is sufficient to point out that the frequencies being discussed are in the ultrasonic range which are from 15,000 Hz. upward. Those skilled in the art will recognize that the particular frequency of operation is not as important as maintaining the correct or optimal frequency as determined by the system and its load. The method and apparatus for accomplishing this are described below.

The schematic illustrated in the drawings consists basically of a (1) power supply and control circuit, (2) a power output circuit, (3) a gating circuit, and (4) an oscillator control network with sensing circuitry. The power supply and control circuit, power output circuit and gating circuit are known circuits for powering and controlling ultrasonic transducer 10. The power supply and control circuit is designated generally as 12 and is contained within the broken lines in FIGS. 1A and 1B which surround that numeral. The power supply and control circuit 12 includes means 14 for connecting the circuit to a source of commercial power, preferably at 120 volts and 60 Hz.; fuses 16; an appropriate power control switch 18 with functions as labeled; a rectifier circuit 20; a timer 22; a switch 24 controlling timer 22 for permitting the use of timed intervals; and a power level selection switch 26. Because the power supply and control circuit is known and does not form any novel feature of the present invention, except insofar as it is used to provide the power for the novel features of this invention, it will not be described in detail. Each of the circuit elements is shown in its conventional symbolic form and labeled with identifying indicia. A legend of the indicia together with a description of the element which they identify and its electrical value, where appropriate, is provided at the end of this disclosure. Those skilled in the art can construct and operate the power supply and control circuit with the information thus provided.

Figure 1B:
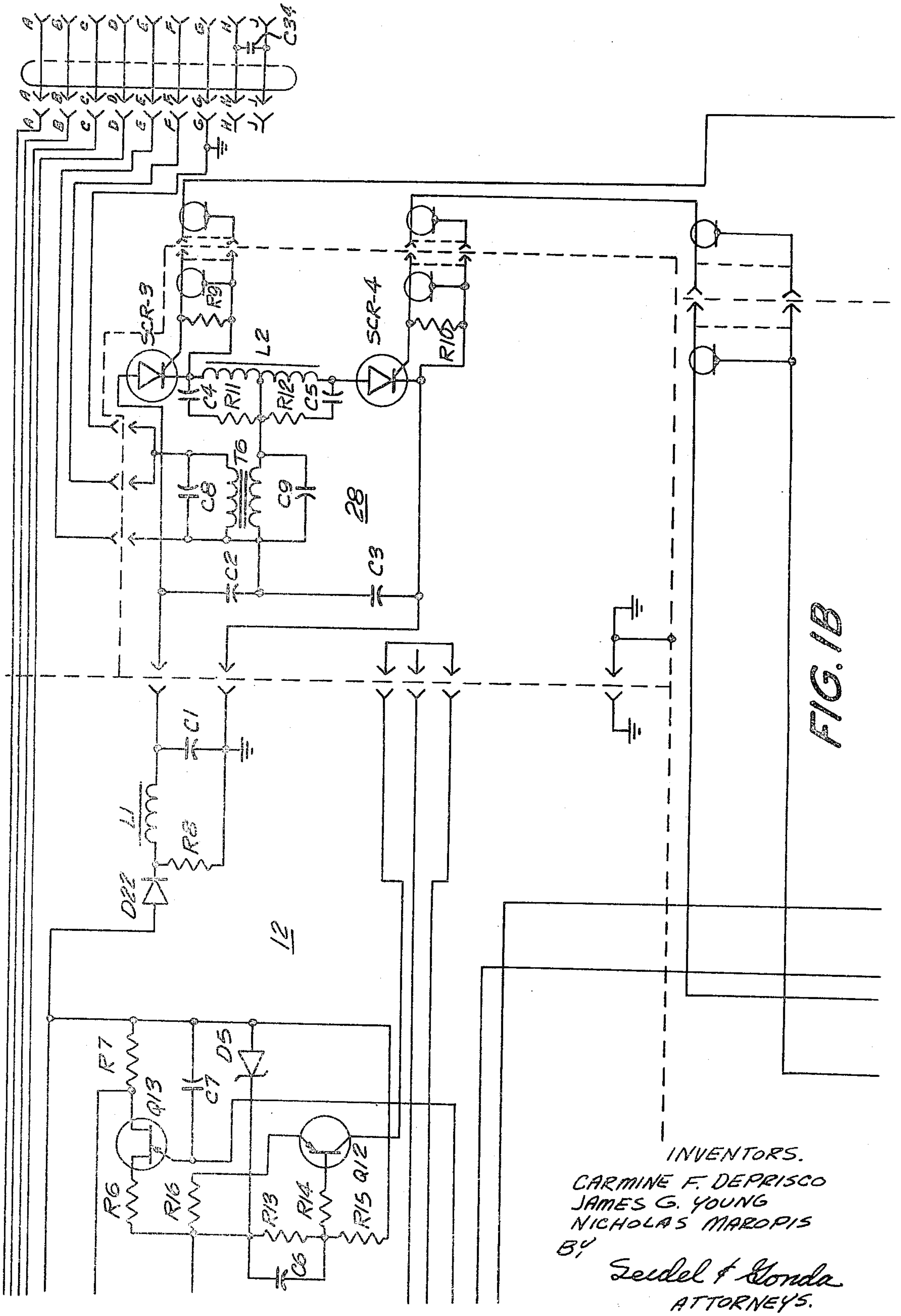
FIG. 1B shows a second portion.

In FIG. 1B the power output circuit 28 is shown as a silicon controlled rectifier inverter circuit. A detailed description of the power output circuit is provided in U.S. patent application Ser. No. 520,726 for high frequency, high power source solid state inverter invented by Carmine F. De Prisco, now U.S. Pat. No. 3,460,025. Accordingly, this circuit need not be described in further detail. As in the case of the power supply control circuit 12, conventional symbols are used to identify the electrical elements and identifying indicia for each element are provided. The indicia and hence the elements are described in the legend at the rear of this disclosure. Given the information thus provided, those skilled in the art can readily construct and operate this portion of the circuit.

Figure 1C:
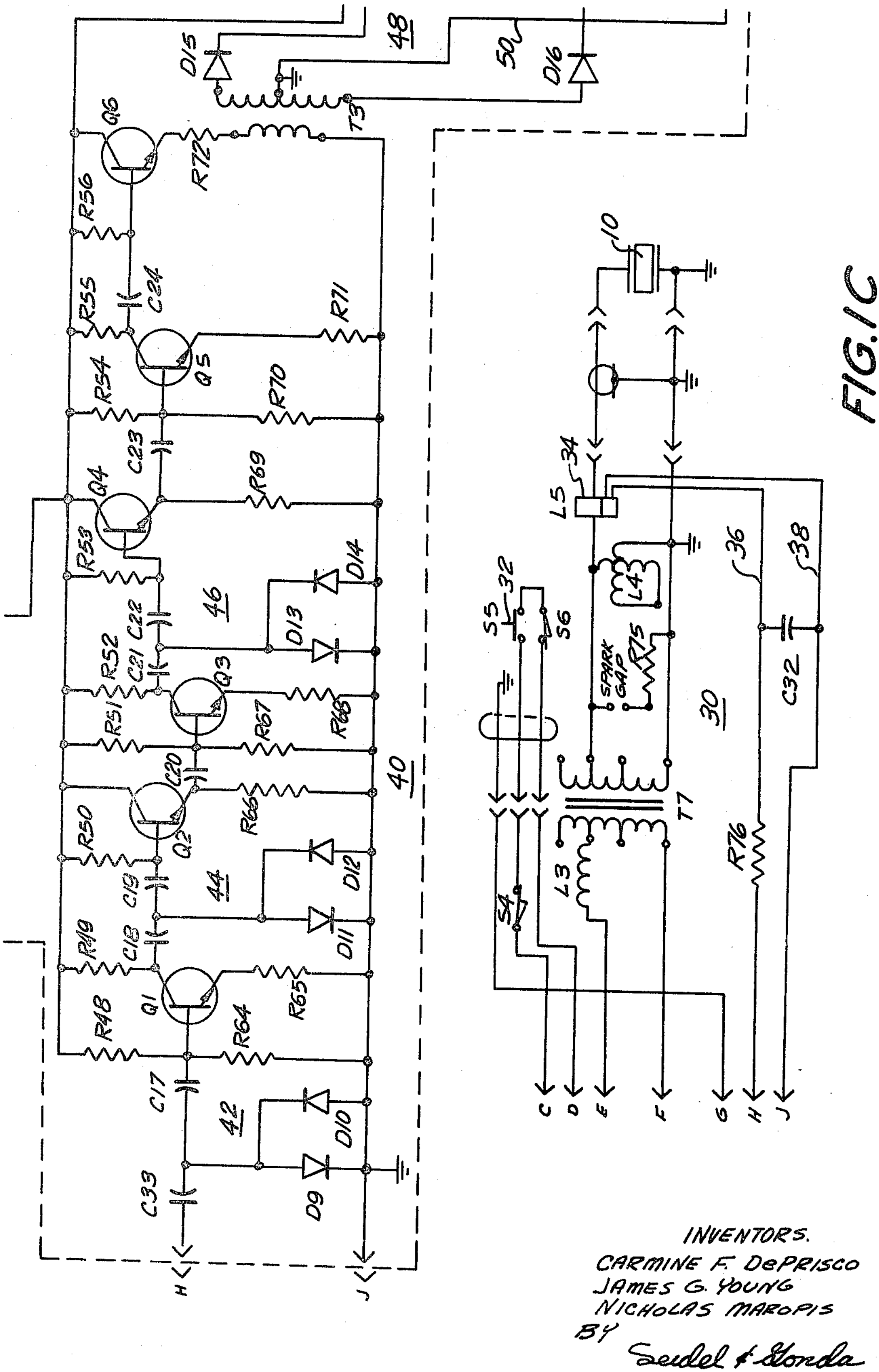
FIG. 1C shows a third portion.
Figure 1D:
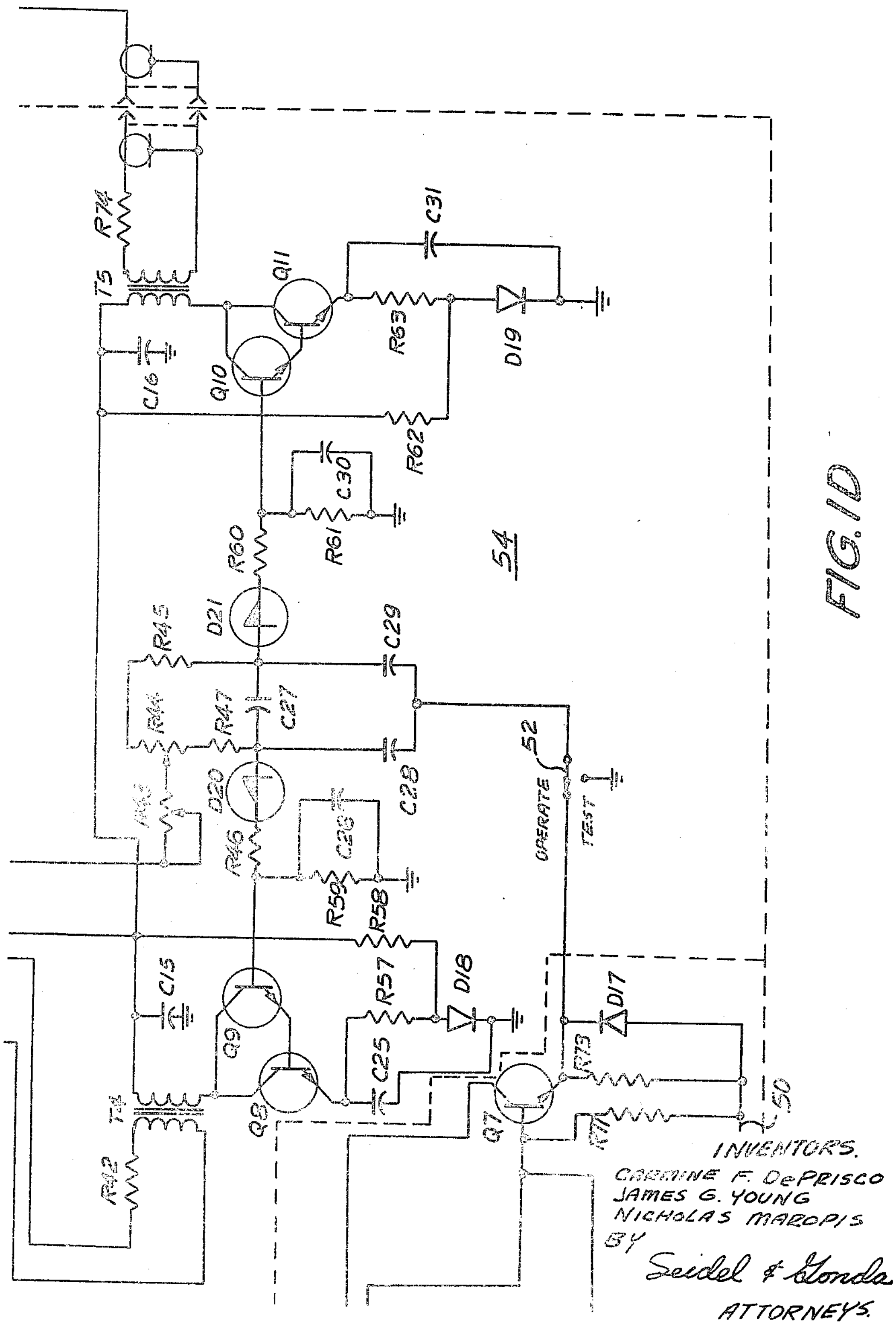
FIG. 1D shows a fourth portion.

Referring now to FIG. 1C, there is illustrated a schematic diagram of the transducer 10 and its associated circuitry which is connected to the power output circuit 28. Such connections are indicated by the mating arrowheads which are appropriately labeled by corresponding numbers. The transducer 10 is normally located some distance from the remaining portions of the circuit and connected thereto by a cable which may be fifty or more feet in length. The impedance matching network from the frequency converter to the transducer is designated generally as 30 and is normally located near the transducer 10. In addition, a local control switch 32 is provided for use by the operator at the work station. The function of the impedance matching network 30 is well known to those skilled in the art and need not be described in detail. For purposes of this disclosure, the electrical elements have been shown by conventional symbols labeled with identifying indicia. The indicia is set forth in a legend which forms a part of this disclosure with appropriate descriptions of the various electrical elements.

The transducer 10 may be any one of a number of ultrasonic transducers used to drive ultrasonic work producing mechanisms. Such transducers are well described in the literature. See, for example U.S. Pat. No. 2,946,119 issued July 26, 1960, which describes the magnetostrictive type of transducer. The present invention is useful with other types of transducers including the ceramic (electrostrictive) type. In the embodiment described herein, the transducer 10 is of the electrostrictive type and hence is voltage driven.

The sensing element 34 is preferably a pickup coil surrounding a conductor which transmits power to the transducer 10. The voltage induced in sensing element 34 is conducted through conductors 36 and 38 back to the oscillator control network 40 illustrated in FIG. 1C. The connection into oscillator control circuit 40 is illustrated by the connectors H and J. The voltage induced in coil 34 will be a sine wave. Since a low level voltage may be transmitted over various lengths of cable, a phase shifting network in the form of resistor R76 and capacitor C32 can be adjusted so as to maintain the sine wave in the proper time relationship. It should be appreciated that the time relationship between the sine wave voltage generated in sensing element 34 and the sine wave current actually applied to transducer 10 must be maintained or the entire synchronization of the silicon controlled rectifiers in the inverter circuit will be disturbed. The purpose of this invention is to properly correct the frequency of this system and this could not be accomplished unless the phase relationship between the voltage in coil 34 and the current in transducer 10 is maintained.

The sine wave input at terminals H and J is first put through a clamping circuit 42 which consists of diodes D9 and D10 and capacitors C33 and C17 connected across the terminals H and J as well as the resistors R48 and R64. The function of the clamping circuit is to maintain a constant signal amplitude level, independent of the incoming signal level. The clamping circuit 42 adjusts the sine wave voltage so that it is at the correct polarity for operating the remaining portion of the oscillator control network 40.

The transistor Q1 together with the resistors R49 and R65 amplifies the clamped signal derived by the sensing element 34. This amplified signal is again clamped by the clamping circuit 44 consisting of capacitors C18 and C19, resistor R50 as well as diodes D11 and D12. Due to the clamping action of clamping circuits 42 and 44 and the amplification function of transistor Q1, the voltage applied to the base of transistor Q2 is primarily an alternating square wave.

The emitter of transistor Q2 is connected to capacitor C20 which is connected between resistors R66 and R67 as well as to the base of transistor Q3. Resistors R66 and R67 are also connected to ground. In addition, capacitor C20 is connected to one terminal of resistor R51 which is connected to the collector of transistor Q2. The function of this circuit is to maintain the identity of the leading edge of the square wave as applied to the base of transistor Q2. These pulses are applied to the base of transistor Q3 which again amplifies them and applies them to the clamping circuit 46 consisting of capacitors C21 and C22, resistor R53 and inverse-parallel connected diodes D13 and D14. The phase identity of the voltage pulses must be maintained the same as it was when detected by the coil 34. If, by way of example, the system is operating at the nominal frequency of 28 kHz., then each sine wave has a period of just slightly more than thirty-five microseconds. This means that a positive or negative pulse must be present at the output of transistor Q3 approximately once every 17.5 microseconds.

The output of clamping circuit 46 is applied to transistor Q4 which is connected in an emitter-follower circuit having a load resistor R69. The function of an emitter-follower circuit for use in impedance matching applications is well known and need not be described in detail.

The output of transistor Q4 is amplified by transistors Q5 and Q6 connected in circuit with capacitors C23, resistors R54 and R70, resistors R55 and R71, capacitor C24, resistor R56 in an area illustrated. The output of transistor Q6 is applied through resistor R72 to the primary of transformer T–3. Thus, a series of alternating voltage pulses with a predetermined period are applied to the primary of transformer T–3.

The secondary of transformer T–3 is connected to a full wave rectifying circuit 48 consisting of diodes D15 and D16 whose cathodes are connected to the base of transistor Q7. The secondary of transformer T–3 is provided with a grounded center tap 50 which is connected through resistor R77 to the base of transistor Q7. As thus connected, the rectifier circuit 48 combines with the transformer action of the secondary of transformer T–3 to provide a frequency doubler circuit. The manner in which a center tap transformer connected in a rectifying circuit doubles frequency is well known and need not be described in detail.

A double frequency is required because positive pulses are required to synchronize the free running multivibrator. In addition to doubling the frequency, all of the voltage pulses now have the same polarity with a period equal to one-half their previous period. In the same example discussed above, the time period between positive voltage pulses was 35 microseconds. At twice the frequency it will now be 17.5 microseconds.

The transistor Q7, together with the resistor R73 and diode D17 connected in its emitter circuit amplifies the double frequency pulses so as to maintain their identity, as discussed heretofore. The diode D17 removes any negative pulses. The output of transistor Q7 is applied through switch 52 to the common terminal of capacitors C28 and C29. Switch 52 is shown in its operating position. It could, however, be moved to the test position wherein the common terminal of C28 and C29 would be connected to ground only.

When the switch 52 is in the operate position, the output of transistor Q7 is applied to a gating circuit 54 for the silicon controlled rectifiers SCR3 and SCR4 in FIG. 1B. The gating circuit 54 consists basically of a free running multivibrator circuit. The multivibrator circuit is centered around two four-layer breakover diodes D20 and D21. Diodes D20 and D21 are connected in what could be termed an astable multivibrator or relaxation oscillator circuit. The frequency of the oscillator output depends upon the capacitance of capacitors C28 and C29 as well as the circuit values of capacitors C27, resistors R47 and R45. The voltage bias is set by potentiometer R43. Symmetry is adjusted by potentiometer R44. The outputs of diodes D20 and D21 are positive pulses which trigger Darlington circuits Q9, Q8 and Q10, Q11, respectively. The emitter of transistor Q8 is connected to capacitor C25 and one terminal of resistor R57. Resistor R57 is connected to the anode of diode D18. The cathode of diode D18 is connected to ground as is the other terminal of capacitor C25. The anode of diode D18 is connected through resistor R58 to the direct current supply voltage. One end of the primary of transformer T-4 is connected to the direct current voltage source and the other end to collectors of transistors Q8 and Q9.

Transistors Q10 and Q11 are connected in a circuit identical to that of transistors Q8 and Q9 and hence is not described in detail.

As thus connected, transistors Q8 and Q9 on the one hand and transistors Q10 and Q11, form Darlington-type circuits which provide fast rising pulses in response to the output of the multivibrator circuit. The function of capacitor C25, resistor R57, diode D18 and resistor R58 and its counterpart circuit capacitor C31, resistor R63, diode D19 and resistor R62 is to obtain the required pulse width to properly gate the output circuits. Darlington-type circuits will generate fast-rising pulses with predetermined pulse width to properly gate the silicon controlled rectifiers when operating at these frequencies. In the preferred embodiment, the pulses have a rise time of less than 0.1 microsecond and a 10-volt peak. The total pulse width may be 1.5 to 2 microseconds.

The gating circuit thus described is known and has previously been used for gating silicon controlled rectifiers in ultrasonic frequency applications. Thus, if the switch 52 is moved to the test position, the multivibrator will oscillate at its free running frequency and the entire circuit 54 will generate gating pulses at that frequency. These pulses are coupled by the transformers T-4 and T-5 through the resistors R42 and R74 to the gating circuit of the silicon controlled rectifiers SCR3 and SCR4. Coaxial cables are preferably used for this coupling function.

In accordance with the present invention, the optimum frequency for the transducer-coupling system as determined by the system and its load is detected by the sensing element 34 and fed back through the oscillator control network 40 which generates a series of timed pulses at double the frequency. This double frequency is applied to the multivibrator or oscillator for the gating circuit by moving the switch 52 from the test to the operate position. Since the multivibrator in the gating circuit 54 is a free running relaxation type oscillator, it synchronizes to the pulse developed by the oscillator control network. The free running oscillator is designed to operate at approximately 2 kHz. below the optimum frequency. This insures synchronization with pulses of less than 38/2 or a 19-microsecond repetition rate.

In operation, the "tracking" or "hunting" nature of the sensing circuit has been found to contribute an additional advantage to the present invention. Because of the tracking error between the desired optimum frequency and the sensed signal, a small degree of frequency variation occurs between the actual frequency and the optimum frequency. It has been observed that the random sweeping back and forth across the optimum frequency serves advantageously to take into account all of the otherwise unaccountable factors which cause slight changes in operating frequency during the operating cycle.

The present invention has been described in connection with an embodiment wherein the sensing means 34 consists of a coil for detecting the current applied to the transducer 10. As an alternative, the sensing element could be a small transducer located at a nodal point of a full half wave segment on the electroacoustic transducer. By positioning the sensing transducer at this point, the measured amplitude will be a maximum at the frequency at which maximum vibratory amplitude prevails on the loaded side of the transducer array, regardless of the load impedance or other characteristics. The transducer can be a piezoelectric crystal element fixed one-quarter wavelength from the free end of a power delivery element. The mechanical motion existing at the nodal plane one-quarter wavelength from the free end is proportional to the vibratory amplitude at the free end. The vibratory amplitude of the free end is always proportional to the vibratory amplitude at the loaded end. Therefore, the signal derived from the crystal element will always be proportional to the vibratory energy at the loaded end. Moreover, the vibratory motion at the loaded end is always a maximum at the frequency at which the load impedance is minimal. When this condition prevails, maximum power delivery conditions prevail. Accordingly, the feedback of the frequency derived by the piezoelectric crystal not only selects the best operating frequency but it also tends to discriminate to the extent that the frequency of operation (within preset operating band) is the frequency at which maximum acoustic power will be delivered.

For purposes of constructing an automatic frequency control circuit in accordance with the schematic illustrated in the drawings, the following legend sets forth the parameters or description of the item or indicia used.

| Item or symbol | Description |
|---|---|
| C1 | Capacitor, 1,000 ufd., 150 wvdc. |
| C2 | Capacitor, 0.33 ufd., 600 wvdc. |
| C3 | Same as C2. |
| C4 | Capacitor, 0.005 ufd., 600 wvdc. |
| C5 | Same as C4. |
| C6 | Capacitor, 20 ufd., 50 wvdc. |
| C7 | Capacitor, 0.15 ufd., 100 wvdc. |
| C8 | Capacitor, 0.20 ufd., 2kwvdc. |
| C9 | Capacitor, 0.01 ufd., 600 wvdc. |
| C10 | Capacitor, 0.2 ufd., 100 wvdc. |
| C11 | Capacitor, 2,000 ufd., 50 wvdc. |
| C12 | Same as C6. |
| C13 | Same as C6. |
| C14 | Same as C6. |
| C15 | Same as C6. |
| C16 | Same as C6. |
| C17 | Capacitor, 0.1 ufd., 100 wvdc. |
| C18 | Same as C17. |
| C19 | Same as C17. |
| C20 | Same as C17. |
| C21 | Same as C17. |
| C22 | Same as C17. |
| C23 | Same as C17. |
| C24 | Same as C17. |
| C25 | Same as C7. |
| C26 | Capacitor, 560 pfd., 300 wvdc. |
| C27 | Capacitor, 2,000 pfd., 500 wvdc. |
| C28 | Same as C27. |
| C29 | Same as C27. |
| C30 | Same as C26. |
| C31 | Same as C7. |
| C32 | Capacitor, 1,000 pfd., 500 wvdc. |
| C33 | Same as C27. |
| C34 | Capacitor, 1,800 pfd., 500 wvdc. |
| CB1 | Circuit breaker, 250 volt, 20 amps. |
| D1 | Thyrector diode. |
| D2 | Same as D1. |
| D3 | Diode, IN1695. |
| D4 | Same as D3. |
| D5 | Zener diode, 22 volt, 1 watt IN1527. |

| Item or symbol | Description |
|---|---|
| D6 | Full wave bridge rectifier, 100 volt, 10 A. |
| D7 | Zener diode, 30 volt, 10 watt. |
| D8 | Zener diode, 18 volt, 1 watt, IN1526A. |
| D9 | Diode, IN3606. |
| D10 | Same as D9. |
| D11 | Same as D9. |
| D12 | Same as D9. |
| D13 | Same as D9. |
| D14 | Same as D9. |
| D15 | Same as D9. |
| D16 | Same as D9. |
| D17 | Same as D9. |
| D18 | Diode, IN2069. |
| D19 | Same as D18. |
| D20 | Diode, Shockley, 4 layer, IN3840. |
| D21 | Same as D20. |
| D22 | Diode, A40D. |
| F1 | Fuse, 250 volt, 10 amp. |
| F2 | Same as F1. |
| F3 | Fuse, 250 volt, 1 amp. |
| I1 | Panel indicator. |
| I2 | Indicator. |
| L1 | Inductor, 0.05 hy. 1.0 ohm, 6 amp. |
| L2 | Inductor, 76 μhy. |
| L3 | Inductor, 180 μhy. |
| L4 | Litz coils. |
| L5 | Pickup coil, 10.5 μhy. |
| Q1 | Transistor, 2N2923. |
| Q2 | Same as Q1. |
| Q3 | Same as Q1. |
| Q4 | Same as Q1. |
| Q5 | Same as Q1. |
| Q6 | Same as Q1. |
| Q7 | Same as Q1. |
| Q8 | Transistor, T.I. P14. |
| Q9 | Same as Q8. |
| Q10 | Same as Q8. |
| Q11 | Same as Q8. |
| Q12 | Transistor, 2N404. |
| Q13 | Transistor, unijunction, 2N1671A. |
| R1 | Resistor, carbon, 100K ohms, 2 w. |
| R2 | Same as R1. |
| R3 | Resistor, wirewound, 3 ohms, 5.5K watt. |
| R4 | Resistor, carbon, 27 ohms, ½ watt. |
| R5 | Same as R4. |
| R6 | Resistor, carbon, 390 ohms, ½ watt. |
| R7 | Resistor, carbon, 47 ohms, ½ watt. |
| R8 | Resistor, wirewound, 2K ohms, 25 watt. |
| R9 | Resistor, carbon, 51 ohms, ½ watt. |
| R10 | Same as R9. |
| R11 | Resistor, wirewound, non-inductive, 100 ohms, 50 watt. |
| R12 | Same as R11. |
| R13 | Resistor, carbon, 68K ohms, ½ w. |
| R14 | Resistor, carbon, 180K ohms, ½ watt. |
| R15 | Resistor, carbon, 15K ohms, ½ w. |
| R16 | Resistor, carbon, 1,500 ohms, ½ w. |
| R17 | Potentiometer, ¼ watt, .25 meg., linear taper. |
| R18 | Resistor, carbon, 10,000 ohms, ½ watt. |
| R19 | Resistor, carbon, 270K ohms, ¼ watt, 5%. |
| R20 | Same as R19. |
| R21 | Same as R19. |
| R22 | Same as R19. |
| R23 | Same as R19. |
| R24 | Same as R19. |
| R25 | Same as R19. |
| R26 | Same as R19. |
| R27 | Same as R19. |
| R28 | Same as R19. |
| R29 | Resistor, carbon, 2.7K ohms, ¼ watt, 5%. |
| R30 | Resistor, carbon, 2.2K ohms, ¼ watt, 5%. |
| R31 | Same as R30. |
| R32 | Resistor, carbon, 4.7K ohms, ¼ watt, 5%. |
| R33 | Same as R32. |
| R34 | Same as R32. |
| R35 | Resistor, carbon, 3.3K ohms, ¼ watt, 5%. |
| R36 | Same as R35. |
| R37 | Resistor, carbon, 7.5K ohms, ¼ watt, 5%. |
| R38 | Resistor, carbon, 4.7K ohms, 2 watts, 10%. |
| R39 | Resistor, wirewound, 75 ohms, 5 watts. |
| R40 | Same as R39. |
| R41 | Resistor, carbon, 220 ohms, 2 watts, 10%. |
| R42 | Resistor, carbon, 10 ohms, ½ watt, 10%. |
| R43 | Potentiometer, 2,500 ohms, ½ watt. |
| R44 | Potentiometer, 5K ohms, ½ watt. |
| R45 | Resistor, 2K ohms, 1%. |
| R46 | Resistor, carbon, 47 ohms, ½ watt. |
| R47 | Same as R45. |
| R48 | Resistor, carbon, 82K ohms, ½ watt, 10%. |
| R49 | Resistor, carbon, 4,700 ohms, ½ w., 10%. |
| R50 | Resistor, carbon, 100K ohms, ½ watt, 10%. |
| R51 | Same as R48. |
| R52 | Same as R49. |
| R53 | Same as R50. |
| R54 | Same as R48. |
| R55 | Same as R49. |
| R56 | Resistor, carbon, 36K ohms, ½ watt. |
| R57 | Resistor, carbon, 8.2 ohms, ½ watt, 5%. |
| R58 | Resistor, carbon, 3.3K ohms, ½ watt, 10%. |
| R59 | Resistor, carbon, 100 ohms, ½ watt, 10%. |
| R60 | Same as R46. |
| R61 | Same as R 59. |
| R62 | Same as R58. |
| R63 | Same as R57. |
| R64 | Resistor, carbon, 10K ohms, ½ watt, 10%. |
| R65 | Resistor, carbon, 470 ohms, ½ w., 10%. |
| R66 | Resistor, carbon, 2,700 ohms, ½ watt, 10%. |
| R67 | Same as R64. |
| R68 | Same as R65. |
| R69 | Same as R66. |
| R70 | Same as R64. |
| R71 | Same as R65. |
| R72 | Same as R59. |
| R73 | Same as R59. |
| R74 | Same as R42. |
| R75 | Resistor, wirewound, non-inductive, 200 ohm, 50 watt. |
| R76 | Resistor, carbon, 2,700 ohms, ½ watt, 10%. |
| R77 | Resistor, carbon, 1.0K ohms, ½ w., 10%. |
| S1 | Switch, rotary keyed. |
| S2 | Switch, rotary, 1 pole-3 section, 2-11 position-non-shorting. |
| S3 | Switch, toggle micro. |
| S4 | Switch, interlock. |
| S5 | Switch, push button. |
| S6 | Switch, micro. |
| S7 | Same as S4. |
| SCR1 | Silicon controlled rectifier C30D. |
| SCR2 | Same as SCR1. |
| SCR3 | Silicon controlled rectifier 2N3658 or C141DX61. |
| SCR4 | Same as SCR3. |
| T1 | Power transformer. |
| T2 | Power transformer. |
| T3 | Pulse transformer. |
| T4 | Pulse transformer. |
| T5 | Same as T4. |
| T6 | Output transformer. |
| T7 | Impedance transformer. |
| U1 | FAN. |
| U2 | Timer. |
| U3 | Filter, rfi. |

The present invention may be embodied in other specific forms without departing from the spirit or essential attributes thereof and, accordingly, reference should be made to the appended claims, rather than to the foregoing specification as indicating the scope of the invention.

It is claimed:

1. In an ultrasonic system including an ultrasonic energy transducer, a power supply and control circuit therefor, a power output circuit including inverter means, and control means for said power output circuit including a free running oscillator, an oscillator control network including a sensing means, said sensing means being positioned to sense the frequency of the power driving the ultrasonic transducer as a load on the power output circuit, pulse generating means for generating a series of pulses in response to the signal sensed by the sensing means, said pulses having the same phase relationship with respect to the power driving the transducer as the phase relationship of the signal generated by the sensing means, and means coupling said pulses to said free running oscillator.

2. In an ultrasonic system in accordance with claim 1 including phase control means for controlling the phase of the sensed signal.

3. In an ultrasonic system in accordance with claim 1 wherein said inverter circuit includes silicon controlled rectifiers, a gating circuit for said silicon controlled rectifiers, and said coupling means including a frequency doubler for doubling the frequency of the pulses.

4. An automatic frequency control circuit for ultrasonic systems comprising a power supply for driving an ultrasonic transducer, said power supply including an inverter circuit, said inverter circuit including silicon controlled rectifiers, means for controlling the frequency of the inverter circuit including an integral oscillator-gating circuit, a detector for detecting the frequency of the power applied to the transducer, and means coupling a signal detected by said detector to said oscillator for synchronizing said oscillator to the signal frequency, whereby said transducer is driven at the signal frequency, said coupling means including means for correcting the phase of said signal.

5. An automatic frequency control circuit in accordance with claim 4 wherein said oscillator is a free running multivibrator.

6. An automatic frequency control circuit in accordance with claim 4 wherein said coupling means includes wave shaping and differentiating circuit for converting sine wave signals into constant amplitude pulses having fast rise times.

7. An automatic frequency control circuit in accordance with claim 4 wherein said coupling means includes a frequency doubler for doubling the frequency of the detected signal.

8. An automatic frequency control circuit for ultrasonic systems comprising a power supply for driving an ultrasonic transducer, said power supply including an inverter circuit, means for controlling the frequency of the inverter circuit including an oscillator, said oscillator being a free running multivibrator, a detector for detecting the frequency of the power applied to the transducer, and means coupling a signal detected by said detector to said oscillator for synchronizing said oscillator to the signal frequency, whereby said transducer is driven at the signal frequency, said coupling means including means for correcting the phase of said signal, said coupling means including a frequency doubler for doubling the frequency of said signal, and said coupling means including wave shaping means for converting sine wave signals into amplitude pulses having a fast rise time.

9. An automatic frequency control circuit for ultrasonic systems in accordance with claim 8 wherein said inverter circuit includes silicon controlled rectifiers and a gating circuit for said silicon controlled rectifiers.

10. An automatic frequency control circuit for ultrasonic systems comprising a power supply for driving an ultrasonic transducer-coupling system, said power supply including an inverter circuit, means for controlling the frequency of the inverter circuit including an oscillator, said oscillator being a free running multivibrator, a detector for detecting the frequency of the power applied to the transducer, and means coupling a signal detected by said detector to said oscillator for synchronizing said oscillator to the signal frequency, whereby said transducer-coupling system is driven at the signal frequency.

References Cited

UNITED STATES PATENTS

| | | | |
|---|---|---|---|
| 2,917,691 | 12/1959 | De Prisco et al. | 318—118 |
| 3,177,416 | 4/1965 | Pijls et al. | 318—118 |
| 3,245,003 | 4/1966 | Chomicki | 331—145 |
| 3,296,511 | 1/1967 | Van der Burgt et al. | 318—116 |
| 3,309,605 | 3/1967 | Hoven | 331—145 X |
| 3,334,292 | 8/1967 | King et al. | 321—66 X |
| 3,403,312 | 9/1968 | Sparing | 318—130 |
| 3,407,344 | 10/1968 | Bansho | 318—130 |
| 3,460,025 | 8/1969 | De Prisco | 321—45 X |

FOREIGN PATENTS

| | | |
|---|---|---|
| 921,948 | 3/1963 | Great Britain. |

DONOVAN F. DUGGAN, Primary Examiner

U.S. Cl. X.R.

318—118; 310—8.1; 321—45